United States Patent [19]

Wreede

[11] Patent Number: 5,214,425
[45] Date of Patent: May 25, 1993

[54] SUPERIMPOSED TELL-TALES

[75] Inventor: John E. Wreede, Azusa, Calif.

[73] Assignee: Hughes Aircraft Company, Los Angeles, Calif.

[21] Appl. No.: 708,403

[22] Filed: May 30, 1991

[51] Int. Cl.$^5$ ............................................. G01C 21/00
[52] U.S. Cl. ................................. 340/980; 340/461; 340/705; 359/24; 359/630
[58] Field of Search ............... 340/980, 705, 461, 485; 358/103; 359/630, 13, 14, 24

[56] References Cited

U.S. PATENT DOCUMENTS

| | | | |
|---|---|---|---|
| 4,078,177 | 3/1978 | Tiemens | 359/24 |
| 4,730,881 | 3/1988 | Taguchi et al. | 359/24 |
| 4,790,613 | 12/1988 | Moss | 340/461 |
| 4,795,223 | 1/1989 | Moss | 340/980 |
| 4,930,847 | 6/1990 | Cederquist | 359/630 |
| 4,973,132 | 11/1990 | McDonald et al. | 359/630 |
| 5,044,709 | 9/1991 | Smith et al. | 359/630 |

Primary Examiner—Jin F. Ng
Assistant Examiner—Brent A. Swarthout
Attorney, Agent, or Firm—L. A. Alkov; W. K. Denson-Low

[57] ABSTRACT

A holographic head-up display having first and second superimposed reflection holograms supported by a vehicle windshield, and first and second playback sources respectively associated with the first and second reflection holograms and positioned such that reflection by the windshield of playback illumination from one playback source is toward the other playback source. In particular, the first and second playback sources are configured such that the centerlines of the playback beams provided by the first and second playback sources are coplanar in a common plane that is substantially normal to the holograms, with the centerlines intersecting generally in the hologram layers and having substantially the same angle of incidence on the hologram layers as measured relative to normal in the common plane.

2 Claims, 1 Drawing Sheet

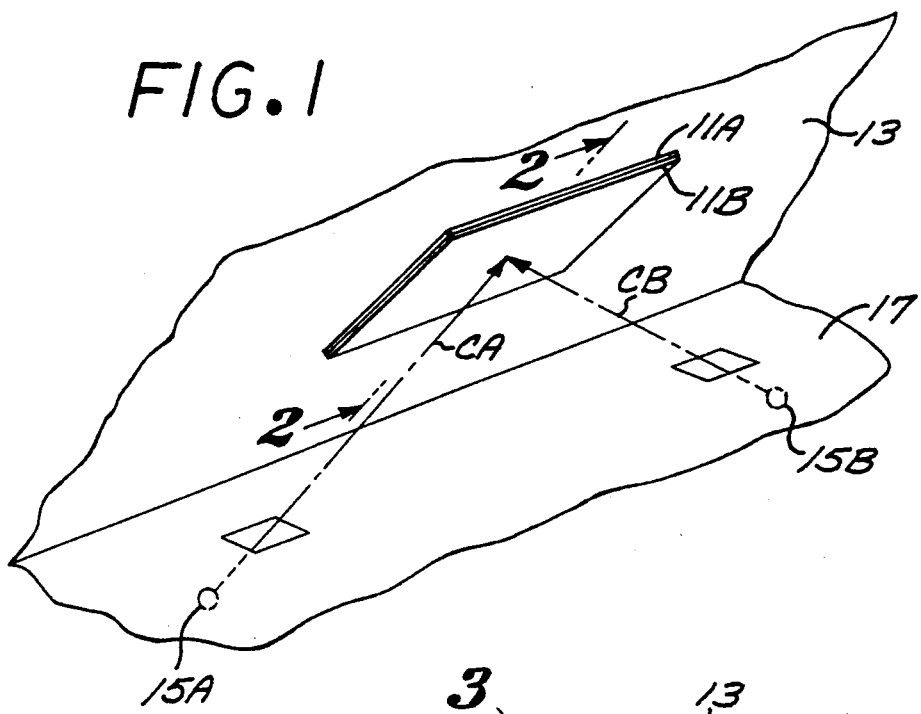
FIG.1
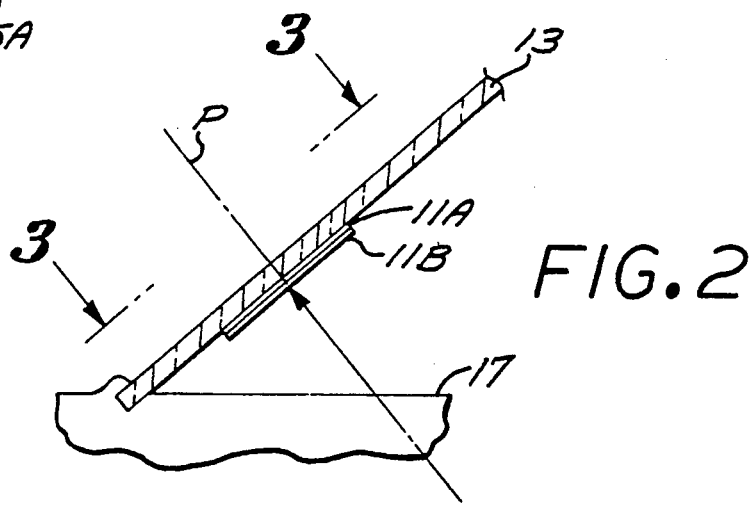
FIG.2
FIG.3
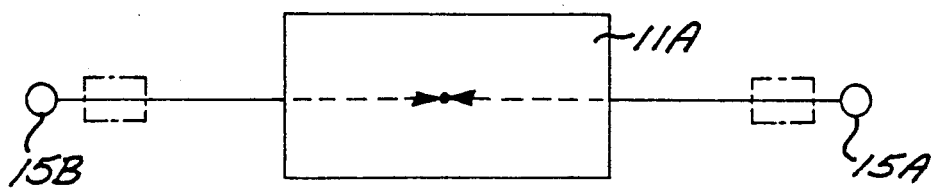

SUPERIMPOSED TELL-TALES

BACKGROUND OF THE INVENTION

The subject invention is generally directed to holographic head-up displays for vehicles, and is directed more particularly to a holographic head-up display having superimposed holographic images.

Head-up displays are utilized in vehicles such as automobiles to produce virtual images of vehicle operating parameter indicators that are ahead of the vehicle windshield and are therefore viewable by operator without diversion of his or her eyes to an instrument panel inside the vehicle. Such indicators status indicators sometimes called "tell-tales" that indicate low fuel, high coolant temperature, low oil pressure and so forth.

A known head-up display technique involves utilizing a reflection hologram supported by the vehicle windshield. The reflection hologram contains a recorded image that is reconstructed pursuant to playback illumination that is selectively turned on to display the recorded image. The playback illumination is commonly directed normal to the reflection hologram, so that the portion of the playback illumination that is reflected back by the windshield returns to the playback source opening in the top of the instrument panel instead of illuminating the top of the instrument panel. Illumination of the top of the instrument panel, particularly at night, causes visuible reflections off the windshield that could interfere with viewing the outside scene.

A consideration with the use of playback illumination that is normal to the hologram is the limitation imposed on the number of holograms that can be used, because of the small optimal area for location of the reflection holograms on the windshield.

SUMMARY OF THE INVENTION

It would therefore be an advantage to provide a holographic head-up display for vehicles that includes a plurality of holograms which are located in the same area on a vehicle windshield and which does not cause reflected playback illumination to illuminate the vehicle dashboard.

The foregoing and other advantages are provided by the invention in a holographic head-up display that includes first and second superimposed reflection holograms supported by a vehicle windshield, and first and second playback sources respectively associated with the first and second reflection holograms and positioned such that reflection by the windshield of playback illumination from one playback source is toward the other playback source. In particular, the first and second playback sources are configured such that the centerlines of the playback beams provided by the first and second playback sources are coplanar in a common plane that is substantially normal to the holograms, with the centerlines intersecting generally in the hologram layers and having substantially the same angle of incidence on the hologram layers as measured relative to normal in the common plane.

BRIEF DESCRIPTION OF THE DRAWINGS

The advantages and features of the disclosed invention will readily be appreciated by persons skilled in the art from the following detailed description when read in conjunction with the drawing wherein:

FIG. 1 is an isometric view schematically depicting an illustrative example of a head-up display in accordance with the invention.

FIG. 2 is an elevational sectional view of the head up display of FIG. 1.

FIG. 3 is a plan view of the head up display of FIG. 1 as viewed from a position normal to the hologram layers of the head up display as indicated in FIG. 2.

DETAILED DESCRIPTION OF THE DISCLOSURE

In the following detailed description and in the several figures of the drawing, like elements are identified with like reference numerals.

Referring now to the drawing figures, schematically set forth therein is a head-up display that includes superimposed hologram layers 11A, 11B which are secured in laminar fashion to the inside surface of a vehicle windshield 13 (as shown), or between the layers of a vehicle safety windshield. The hologram layers 11A, 11B are respectively responsive to substantially collimated playback beams provided by playback sources 15A, 15B which are located in openings in the vehicle dashboard 17. The playback sources are configured so that the central rays CA, CB of the playback beams provided by the first and second playback sources (a) are coplanar in a common plane that is substantially normal to the hologram layers 11A, 11B, (b) intersect generally in the center of the hologram layers, and (c) form substantially identical angles of incidence as measured in the common plane relative to the normal to the hologram layers in the common plane. The common plane is schematically represented as P in FIG. 2.

Each of the hologram layers is constructed to be responsive to an associated playback illumination. Thus, for the example wherein the hologram layer 11A is configured to be responsive to the playback source 15A, playback illumination from the playback source 15A is at the proper angle for reconstruction, while playback illumination from the playback source 15B is at an angle inappropriate for reconstruction. Similarly, playback illumination from the playback source 15B is at the proper angle for reconstruction of the hologram layer 11B, but is at an angle inappropriate for reconstruction of the hologram layer 11A.

By way of illustrative example, the playback sources would be respectively controlled so that only one image is illuminated at any given time, which allows illumination of the more important image without interference from another image. Alternatively, for message that has two degrees of criticality, the first image can be in one color such as amber and the second image can be the same image in another color that is indicative of increased criticality, where the first image does not have to be turned off. The second image can also include additional information, such as the word "VERY" before the words "LOW FUEL" that common to both first and second images.

While not shown, it should be appreciated the holograms can be designed for different colors, and that color selective filters of the appropriate colors could be placed in front of the playback sources. In this manner, the amount of unused light (i.e., light to which a hologram is not responsive) is reduced.

As a result of providing playback beams having central rays in a common plane and at substantially identical incidence angles, the substantially collimated playback illumination from one playback source that is reflected by the hologram layers or a windshield surface will be generally directed into the opening for the other playback source. This concept of having a pair of playback sources arranged to receive reflected illumination originating from each other can be readily implemented in multiple pairs of playback sources and associated superimposed hologram layers. For example, another pair of hologram layers and associated playback sources can be added to the display of FIG. 1 by locating the additional playback sources colinearly with the sources 15A, 15B, with different spacing between the additional playback sources, and with the central rays of the additional beams being coplanar in the plane P and meeting the other conditions described above. As a further alternative, the additional playback sources can be configured to have their central rays in a different plane that is normal to the hologram layers.

The foregoing has been a disclosure of a holographic head-up display that advantageously allows a plurality of holograms to occupy the same area on a vehicle windshield and be independently reconstructed in manner that does not cause reflected playback illumination to illuminate the vehicle dashboard.

Although the foregoing has been a description and illustration of specific embodiments of the invention, various modifications and changes thereto can be made by persons skilled in the art without departing from the scope and spirit of the invention as defined by the following claims.

What is claimed is:

1. A holographic head-up display for a vehicle, comprising:

a first reflection hologram supported by the windshield of the vehicle;

a second reflection hologram laminated over said first reflection hologram;

first and second playback sources respectively associated with said first and second reflection holograms, said playback sources being configured so that reflection by the windshield of playback illumination from one playback source is toward the other playback source; and said first and second playback sources are configured such that the centerlines of their respective beams are coplanar in a common plane that is substantially normal to the holograms, said centerlines intersecting generally in the hologram layers and having substantially identical angles of incidence as measured relative to normal in said common plane so that substantially collimated playback illumination from one playback source that is reflected by said first reflection hologram and said second reflection hologram are generally directed into an opening for said other playback source.

2. The vehicle display system of claim 1 wherein colors of images displayed at the holograms are variable.

* * * * *